United States Patent

Parsons

[15] 3,661,101
[45] May 9, 1972

[54] GRAIN DRILL WITH ROD WEEDER

[72] Inventor: Billie D. Parsons, Milesville, S. Dak. 57553

[22] Filed: Dec. 22, 1969

[21] Appl. No.: 886,975

[52] U.S. Cl. .................................................. 111/69, 172/44
[51] Int. Cl. ....................................... A01c 7/18, A01b 39/19
[58] Field of Search ................................ 111/69, 52; 172/44

[56] References Cited

UNITED STATES PATENTS

| | | |
|---|---|---|
| 3,033,135 | 5/1962 | Govin ................................ 172/44 X |
| 3,140,678 | 7/1964 | Morris ............................... 172/44 X |
| 3,146,740 | 9/1964 | Phillips .............................. 172/44 X |
| 3,340,934 | 9/1967 | Wycoff ............................. 172/44 X |

*Primary Examiner*—Robert E. Pulfrey
*Assistant Examiner*—Stephen C. Pellegrino
*Attorney*—Merchant & Gould

[57] ABSTRACT

A mobile frame having grain drilling apparatus affixed thereto and an elongated rod mounted for rotation in a horizontal orientation so as to preceed the grain drill shoes but follow all wheels and the like which preceed the grain drill shoes. The rod is mounted to travel a short distance below the surface of the soil and prepare the soil for the grain drill.

2 Claims, 7 Drawing Figures

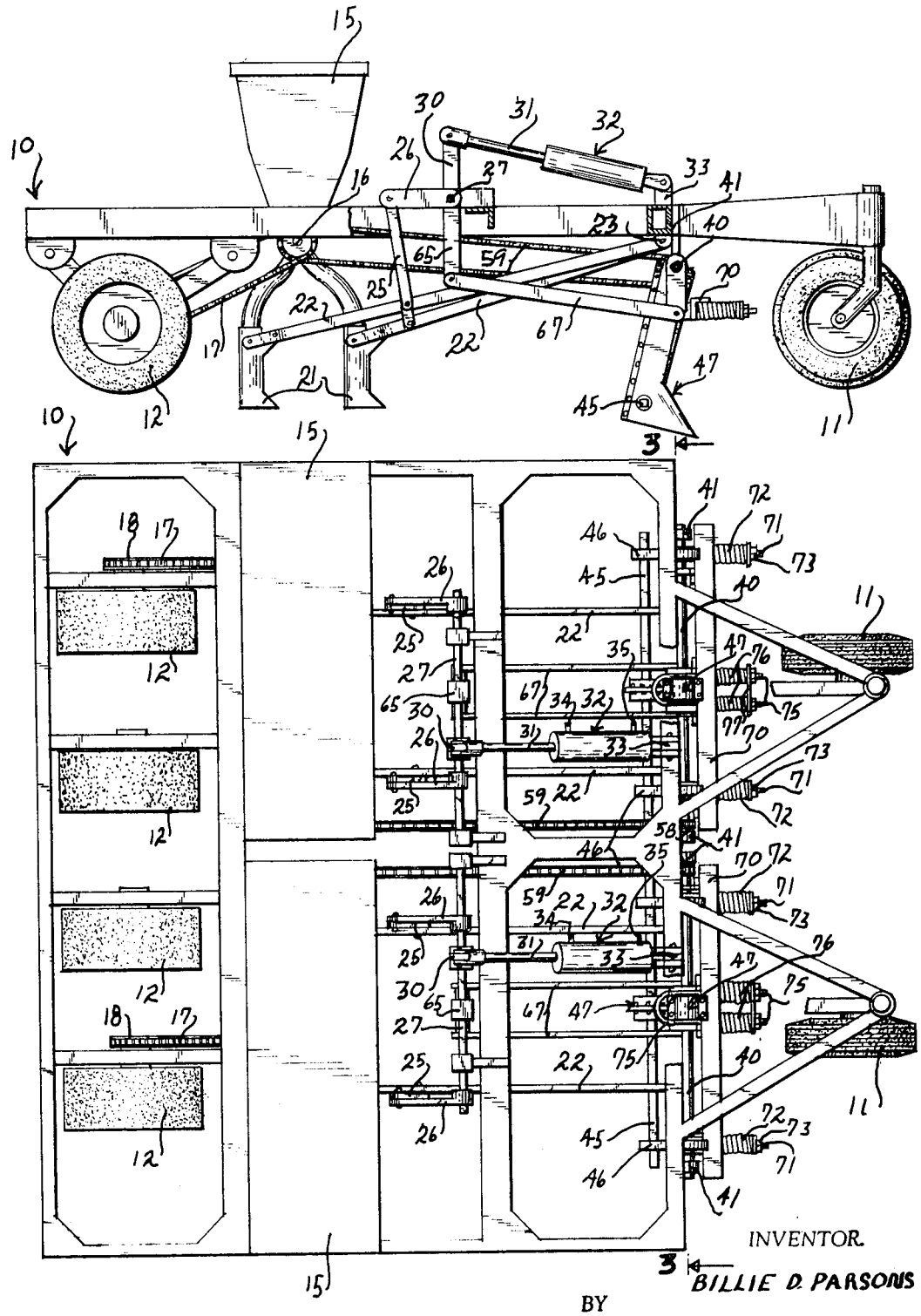

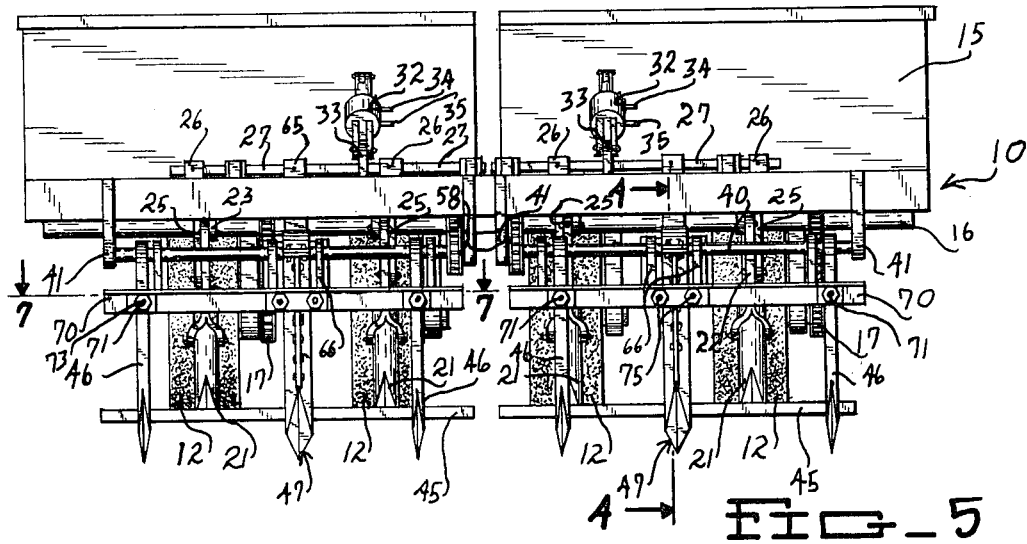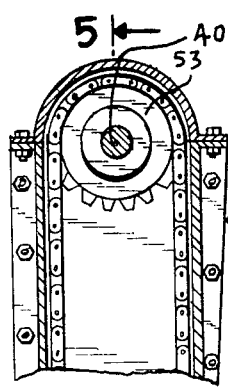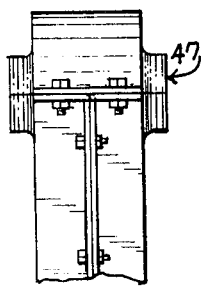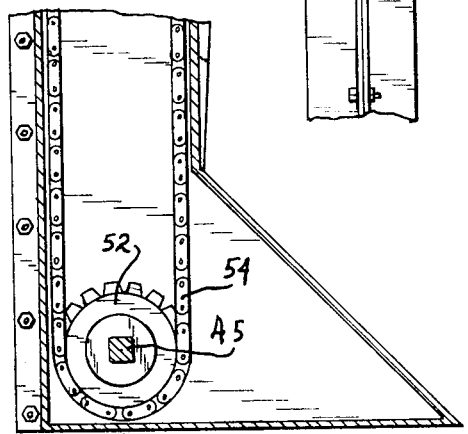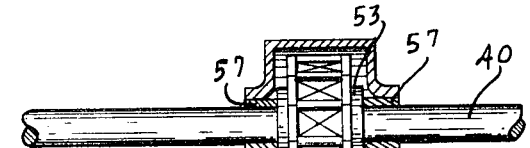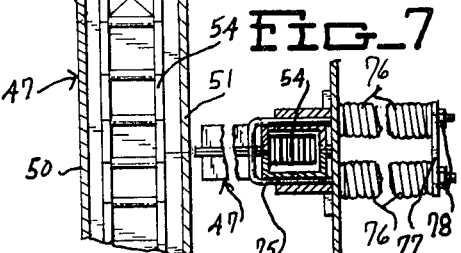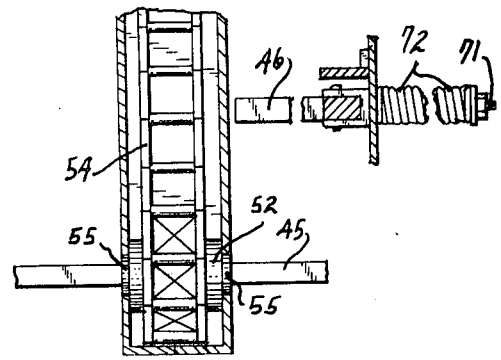

3,661,101

1
GRAIN DRILL WITH ROD WEEDER

BACKGROUND OF THE INVENTION

1. Field of the Invention

In the agricultural field and especially planting and the like, it is imperative that the soil is substantially similar in preparation and the seeds are equal in depth for adjacent rows. If the soil in adjacent rows is prepared differently or if the seeds are planted at different depths, the plants growing therefrom will be of different sizes and will break the soil at different times, whereupon, one row of plants may shade the other and/or take most of the moisture so that the one row will be stunted even further or may die out completely.

2. Description of the Prior Art

In the prior art, rotating rods, such as that disclosed in Sorensen et al, U.S. Pat. No. 2,886,113, are utilized for weeding and the like. Gouin, U.S. Pat. No. 3,033,135, discloses a rod weeder or tiller bar, which is utilized to prepare the soil above the planted seeds. According to Gouin it is not critical where the bar is horizontally positioned relative to the seed planting device but it must be approximately an inch and one-half shallower than the seeds are planted so that the soil thereabove is properly prepared. Each of these devices and all of the other prior art devices are unsatisfactory as disclosed because the wheels of the tractor or the like pack the soil prior to the movement of the seeding device through the soil and subsequent to the movement of the rod weeder or tiller bar through the soil. Thus, generally at least one of the shoes of the seeding device travel in the path of at least one of the wheels and, consequently, the seeds from that shoe are not properly positioned in soil which is properly prepared.

SUMMARY OF THE INVENTION

The present invention pertains to an agricultural implement including seed planting apparatus having a plurality of shoes affixed so as to travel through the soil and an elongated bar mounted to travel through the soil in front of the shoes, subsequent to any wheels or the like passing over the soil, and at a depth approximately equal to the depth at which the seeds are being planted.

It is an object of the present invention to provide an improved agricultural implement of the type including a seed planting device and a rotating horizontal rod.

It is a further object of the present invention to provide an agricultural implement including a rotating horizontal rod positioned to prepare the soil for all of the shoes on a seed planting device.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in side elevation of the improved agricultural implement, portions thereof moved and shown in section;

FIG. 2 is a view in top plan of the implement illustrated in FIG. 1, portions thereof removed and shown in section;

FIG. 3 is a sectional view as seen from the line 3—3 in FIG. 2;

FIG. 4 is an enlarged sectional view as seen from the line 4—4 in FIG. 3, portions thereof removed;

FIG. 5 is a sectional view as seen from the line 5—5 in FIG. 4, portions thereof removed;

FIG. 6 is an enlarged fragmentary view of a portion of the implement; and

FIG. 7 is an enlarged sectional view as seen from the line 7—7 in FIG. 3, portions thereof removed.

2
DESCRIPTION OF THE PREFERRED EMBODIMENT

In the figures the numeral 10 generally designates a frame having two wheels 11 affixed to the forward end thereof and four wheels 12 affixed adjacent the rear end thereof. The wheels 11 are pivotally attached to the frame 10 so that the implement may be conveniently turned during operation and a larger number of wheels 12 are employed, each of which is relatively large, for purposes of packing the soil after the operation. It should be understood that the frame 10 and wheels 11 and 12 are illustrated for exemplary purposes and a variety of innovations and modifications might be included therein.

A hopper 15 is affixed to the frame 10 in upwardly opening relationship with a metering device 16 rotatably mounted in an outlet opening adjacent the bottom thereof. The metering device 16 is rotated by means of a chain 17 engaged over a sprocket affixed to the metering device 16 and a sprocket 18 attached for rotation with the wheels 12. In the present embodiment the entire implement is illustrated as two devices attached in side-by-side relationship to perform as a single unit. Thus, there are actually two hoppers 15 each operated by means of a chain 17 engaged with a sprocket 18 affixed to different wheels 12. Throughout the remainder of the specification, a single unit will be described and it should be understood that the remaining unit is similar.

The metering device 16 has one end of each of a plurality of flexible conduits 20 affixed thereto and the other end of each of the conduits 20 is in communication with a shoe 21. The shoes 21 are standard shoes utilized with seed planting devices such as grain drills and the like and need not be described further, except to point out that they have an opening therethrough constructed to place seeds beneath the soil and the shoes are further constructed to part the soil and form a trench in which the seeds are placed. Each of the shoes 21 has an elongated bar 22 associated therewith, the rear end of the bar being bifurcated to receive the upper portion of a shoe 21 between the branches thereof, and the forward ends of each of the bars being pivotally attached to a plate 23 which is fixedly attached to the frame 10 in a downwardly extending orientation. Each of the bars 22 further has one end of an elongated connecting link 25 pivotally attached adjacent the mid section thereof and the other end of the connecting link 25 associated with each bar 22 is pivotally attached to a crank arm 26. The crank arms 26 are fixedly attached to a shaft 27, for rotation therewith. Shaft 27 is rotatably mounted above the frame 10, forward of the hopper 15 with the crank arms 26 extending generally rearwardly and perpendicular thereto.

A single crank arm 30 is affixed to the shaft 27 for rotation therewith so as to extend generally vertically upwardly therefrom. A connecting arm 31 of a hydraulic cylinder generally designated 32 is pivotally affixed to the uppermost end of the crank arm 30 while the body of the hydraulic cylinder 32 is pivotally affixed to an upwardly extending plate 33, which is in turn fixedly attached to the frame 10. The hydraulic cylinder 32 is a double-acting hydraulic cylinder which causes the crank arm 30 and attached shaft 27 to rotate in a clockwise direction (in FIG. 1) upon application of fluid pressure to a first inlet 34 and causes the crank arm 30 and shaft 27 to rotate in a counterclockwise direction (in FIG. 1) upon application of a fluid under pressure to a second inlet 35. Clockwise and counterclockwise rotation of the shaft 27 produces rotation of the crank arms 26 and consequent raising and lowering, respectively, of the shoes 21.

A shaft 40 is mounted for rotation adjacent the front of the frame 10 by means of bearings 41 affixed to the frame 10 in downwardly extending relationship and engaged over either end of the shaft 40. The bearings 41 mount the shaft 40 for rotation somewhat below the frame 10 (as seen in FIG. 3). An elongated bar 45, having a length sufficient to extend transversely in either direction beyond the spacing of the shoes 21, is mounted for rotation parallel with and below the shaft 40 by means of elongated plates 46, adjacent either end thereof, and a housing generally designated 47 near the center thereof. The plates 46 and housing 47 are shaped generally similar to the shoes 21 for easy movement through the soil and to aid in protecting the various parts, as will be explained presently. Each of the plates 46 have bearings mounted therein adjacent the upper and lower ends for receiving the shaft 40 and bar 45 therethrough. At least the lower bearing in the plates 46 should be sealed to prevent the entrance of dirt and the like therein, wince the bearing will be positioned beneath the surface of the soil during operation of the implement. Thus, the bar 45 is pendulously mounted below the frame 10, by means of the shaft 40, plates 46 and housing 47.

The housing 47 is formed by first and second side members 50 and 51 bolted together along the vertical edges thereof (see FIG. 4) to form a cavity therebetween. A first sprocket 52 is fixedly attached to the bar 45 for rotation therewith and a second sprocket 53 is fixedly attached to the shaft 40 for rotation therewith. A chain 54 engaged over the sprockets 52 and 53 produces rotation of the bar 45 when the shaft 40 is rotated. The two side members 50 and 51 enclose the sprocket 52 and are maintained in place adjacent thereto by means of sealed bearings 55 engaged in the side members 50 and 51 at either side of the sprocket 52. The upper ends of the side members 50 and 51 are bolted to a cap 56, which cooperates with the side members 50 and 51 to enclose the sprocket 53. The housing 47 is maintained in position relative to the sprocket 53 by means of bearings 57 on either side thereof. The housing 47 is designed to protect the sprockets 52 and 53 and the chain 54 from dirt and the like. The shaft 40 has a sprocket 58 fixedly attached thereto adjacent the inner end and a mating sprocket is fixedly attached to the metering device 16. A chain 59 is engaged over the sprocket 58 and the sprocket affixed to the metering device 16 so that the bar 45 rotates with the metering device 16 and the wheels 12. The speed at which the bar 45 rotates may be adjusted to any desired speed by altering the ratio of the various sprockets or it may be variable by providing two or more sprockets on any of the various shafts and providing means for shifting the chains therebetween in any of the well-known methods.

A downwardly extending crank arm 65 is fixedly attached to the shaft 27 adjacent the central portion thereof, for rotation therewith. A pair of downwardly extending crank arms 66 are fixedly attached to the shaft 40 adjacent either side of the housing 47, for rotation therewith. Two elongated connecting links 67 are pivotally connected to the crank arm 65 and the pair of crank arms 66 so that rotation of the shaft 27 and crank arm 65 produce rotation of the crank arms 66 and shaft 40. An elongated angle iron 70 is fixedly attached to the forward edge of the downwardly extending crank arms 66 so as to extend generally horizontally parallel with and below the shaft 40. The length of the angle iron 70 is sufficient to extend outwardly in either direction somewhat beyond the plates 46 on the shaft 40.

Two bolts 71 each having bifurcated heads are pivotally engaged with the plates 46 by positioning the plates 46 between the branches of the bifurcation and engaging bolts through transversely aligned openings provided therefor. The threaded shanks of the bolts 71 extend forwardly from the plates 46 through an opening in the angle iron 70 and compression springs 72 are engaged coaxially thereover and held in place by means of washers and nuts 73. The springs 72 produce a bias on the bolts 71 between the nuts 73 and the angle iron 70 tending to pull the bolts 71 and the pivotally connected plates 46 forwardly. In a somewhat similar fashion a U-bolt 75 extends around the housing 47 and through openings provided therefor in the angle iron 70 with threaded portions of the U-bolt 75 extending outwardly in a forward direction therefrom. A compression spring 76 is placed over each of the shanks of the U-bolt 75 and maintained in place by a plate 77 and nuts 78. Each of the bolts 71 and the U-bolt 75 have stops thereon so that the forward movement of the plates 46 and housing 47 is limited. The plates 46 and housing 47 can move rearwardly and upwardly, however, against the bias of the springs 72 and 76. Thus, in the event either of the plates 46, the housing 47 or the bar 45 strike an obstruction in the soil, the entire assembly can move rearwardly and upwardly until it clears the obstruction, after which it is returned to the normal position by the bias of the springs 72 and 76.

The bar 45 is positioned at approximately the same vertical height as the lowermost portion of the shoes 21. Thus, rotation of the bar 45, which is generally in an upper direction along the forward edge thereof or counterclockwise in FIGS. 1 and 4, loosens the soil, so that the shoes 21 can travel at the same vertical height, and prepares a bed for the seeds. It should be noted that the bar 45 preceeds the shoes 21 but follows all wheels such as wheels 11 of the implement and the wheels of any device pulling the implement. Thus, the bar 45 prepares the soil for the shoes 21 so that it is always uniform and unpacked by the movement of wheels or the like thereover. Further, the vertical heighth of the bar 45 is always maintained the same relative to the shoes 21, so that actuation of the hydraulic cylinder 32 to raise or lower the shoes 41 raises or lowers the bar 45. While the apparatus for raising and lowering the shoes 21 and bar 45 is specifically set forth, it should be understood that many modifications and alterations could be provided and the present apparatus is simply illustrated for exemplary purposes. Further, the bar 45 is illustrated with a generally square cross section but other configurations thereof might also provide the desired functions.

What is claimed is:

1. An agricultural implement comprising:
   a. a frame having wheels attached thereto for moving over the surface of the ground;
   b. a hopper for containing seeds and the like mounted on said frame;
   c. a plurality of shoes constructed to engage the soil and place seeds therein, said shoes being affixed to said frame for movement between a ground engaging position and a raised position;
   d. means affixed to said hopper and said shoes for supplying seeds and the like from said hopper to said shoes at a desired rate;
   e. an elongated bar;
   f. means affixed to said frame and mounting said bar in a generally horizontal orientation for rotation about the longitudinal axis of said bar, said mounting means positioning said bar in front of said plurality of shoes so as to precede said shoes during operative movement of said implement and succeed any of said wheels which precede said shoes, said mounting means further positioning said plurality of shoes and elongated bar for travel at approximately the same vertical height, and said mounting means providing for simultaneous movements of said bar and said shoes between a ground engaging position and a raised position; and
   g. power means engaged with said mounting means for rotating said bar at a predetermined speed.

2. An agricultural implement as set forth in claim 1 wherein the frame is mounted on wheels for movement over the ground and the power means includes drive mechanism attached for rotation with at least one of said wheels so that movement of said implement produces rotation of the bar.

* * * * *